US009299090B1

(12) United States Patent
Tsypliaev et al.

(10) Patent No.: US 9,299,090 B1
(45) Date of Patent: Mar. 29, 2016

(54) METHOD FOR RENDERING ADVERTISEMENTS ON MOBILE DEVICES

(71) Applicant: SlickJump, Inc., Tortola (VG)

(72) Inventors: Maxim V. Tsypliaev, Moscow (RU); Nikita A. Vinokurov, Moscow (RU)

(73) Assignee: Slickjump, Inc., Tortola (VG)

( * ) Notice: Subject to any disclaimer, the term of this patent is extended or adjusted under 35 U.S.C. 154(b) by 0 days.

(21) Appl. No.: 13/871,886

(22) Filed: Apr. 26, 2013

(51) Int. Cl.
*G06Q 30/02* (2012.01)

(52) U.S. Cl.
CPC ........ *G06Q 30/0267* (2013.01); *G06Q 30/0277* (2013.01); *G06T 2200/24* (2013.01)

(58) Field of Classification Search
CPC .......... G06Q 30/0277; G06Q 30/0251; G06Q 30/0241; G06Q 30/02; G06Q 30/00; G06Q 30/0276; H04M 1/7253; H04M 3/4878; A63F 2300/552; H04N 21/25891; H04N 21/812
USPC ......................................................... 705/14
See application file for complete search history.

(56) References Cited

U.S. PATENT DOCUMENTS

| 7,030,860 | B1 * | 4/2006 | Hsu et al. ...................... 345/173 |
| 2006/0004630 | A1 * | 1/2006 | Criddle et al. .................. 705/14 |
| 2008/0276269 | A1 * | 11/2008 | Miller .................... G06Q 30/02 725/34 |
| 2010/0083191 | A1 * | 4/2010 | Marshall ....................... 715/863 |
| 2010/0222046 | A1 * | 9/2010 | Cumming ..................... 455/418 |
| 2011/0288913 | A1 * | 11/2011 | Waylonis et al. ........... 705/14.4 |
| 2012/0209706 | A1 * | 8/2012 | Ramer et al. ............... 705/14.51 |
| 2013/0019261 | A1 * | 1/2013 | Huber et al. .................... 725/32 |

FOREIGN PATENT DOCUMENTS

WO    WO 03/025696 A2 *  3/2003

\* cited by examiner

*Primary Examiner* — Jamisue A Plucinski
*Assistant Examiner* — Rashida Robinson Shorter
(74) *Attorney, Agent, or Firm* — Bardmesser Law Group (57) ABSTRACT

A method for rendering advertisements on touchscreen devices having small screens is provided. Components of the existing GUI (i.e., controls) are used for rendering advertisement (or other) data. Existing mobile device GUI elements have visible surfaces filled with a background color (or pattern). These surfaces are "painted" by an advertisement data similar to a wall painted by graffiti. The advertisement data can be static or it can be generated on-the-fly. The GUI controls can be used independent of each other. Thus, the advertising data can be selectively displayed only on some of the controls without distracting the user from the main tasks.

14 Claims, 11 Drawing Sheets

No Banner

Traditional Banner

"Graffito" Banner

"Graffito" Banner

Traditional Banner

FIG. 6

No Banner

METHOD FOR RENDERING ADVERTISEMENTS ON MOBILE DEVICES

BACKGROUND OF THE INVENTION

1. Field of the Invention

The present invention is related to touchscreen devices, and more particularly, to rendering advertisements on touchscreen devices using elements of existing/preloaded graphic user interfaces (GUIs).

2. Description of the Related Art

An existing market of advertisement on touchscreen devices (i.e. mobile devices, smartphones, desktop, netbook, laptop, TV-set, game console, etc.) has been basically formed by application of the technologies and principles of advertising used on PCs and notebooks to mobile platforms. However, the effectiveness of advertising on mobile devices is significantly lower compared to advertising on PCs.

Mobile device users typically run special thin applications instead of heavy-footprint conventional browsers that take up a lot of system resources. Thus, mobile users do not use conventional searches nearly as often as PC users. Accordingly, the most popular means of monetization on mobile devices are advertisement banners and applications integrated into web resources.

The banners are small ads that take up portions of a mobile device screen, which is typically quite small. Because the banners are also very small, they contain very basic advertisement data (i.e., a short text). These basic ads mostly irritate the users and do not attract attention or spark user interest.

The most commonly used method for mobile advertising is using the ads, along with free applications that carry, i.e., ads that are essentially forced upon users, who download a free application or a game. These ads do generate some small profits due to growth of the mobile device market, but in general are also ineffective.

The conventional mobile device advertising banners take up a large portion of an already small screen and irritate a user. Furthermore, the ad banners often appear within an application or a game. The user is focused on the application or the game and pays very little attention to the ads. So these advertisements often distract the user and, in essence, act as anti-advertisements.

All of the conventional mobile advertisement systems such as Google AdMob employ the above described forced ads. In other words, the advertisement systems are "Blind Networks" that render ads without much concern for its audience. In some implementations, these networks collect and analyze user personal and/or geolocation data and act as "Targeted Networks", which also has proven to be ineffective on mobile platforms.

Accordingly, a method for rendering ads on mobile devices, which takes into consideration the small screen size, is desired.

SUMMARY OF THE INVENTION

The present invention is intended as a method and system for rendering advertisements on mobile devices using existing GUI elements that substantially obviates one or several of the disadvantages of the related art.

In one aspect of the invention, a method for rendering advertisements on mobile devices having small screens is provided. The ads used on the small screen do not require any additional "shelf space." According to an exemplary embodiment, components of the existing GUI (i.e., controls) are used for rendering advertisement (or other) data.

All existing mobile device GUI elements have visible surfaces filled with a background color (or pattern). These surfaces are "painted" by advertisement data similar to a wall painted by the graffiti. The advertisement data can be static or it can be generated on-the-fly. The GUI controls can be used independent of each other. Thus, advertising data can be selectively displayed only on some of the controls without distracting the user from the main tasks. In one embodiment, a separate active GUI element is implemented for providing a user with a feedback capability. In other words, the user can react to a particular ad.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method and system for displaying advertisements (or, more generally, promoted items, or promoted information, or information generated in response to user goals) over existing mobile device GUI elements are provided. The ads used on the small screen do not require any additional "shelf space," because they are displayed within the existing GUI controls.

According to an exemplary embodiment, the existing GUI components (i.e., controls) are used for rendering advertisement (or other) data. All mobile device GUI elements have visible surfaces filled with a background color (or pattern). These surfaces are "painted" by advertisement data similar to a wall painted by the graffiti. Accordingly, herein such ad banners are referred to as "graffito" banners. The "graffito" ads can be static images or they can be video clips or animated pictures.

The GUI controls can be used independent of each other. Thus, advertising data can be displayed selectively only on some of the controls without distracting the user from the main tasks. In one embodiment, a separate active banner header is implemented for providing a user with a feedback capability. In other words, the user can react to particular ads using a dedicated control(s). The controls can initiate different scenarios, which include but are not limited to: showing a full-screen banner with a detailed description of the product(s) and/or service(s), sending a coupon/promotional code to the user, opening a page in the browser, activating an application, activating a chat with the merchant/service representative, sending a message (email, SMS, Facebook message or similar, etc.) to the user.

Figure 1:
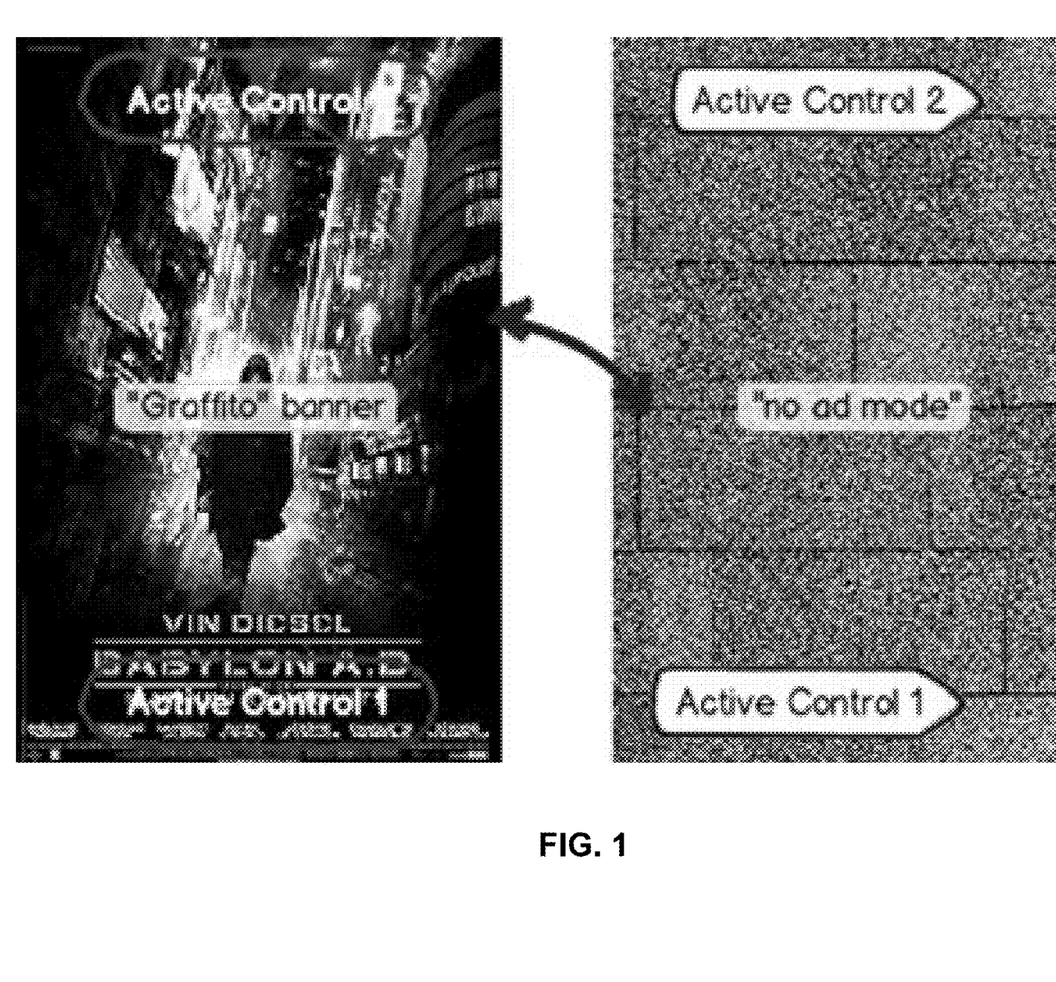
FIG. 1 illustrates an example of a "graffito banner," in accordance with the exemplary embodiment.
Figure 2:
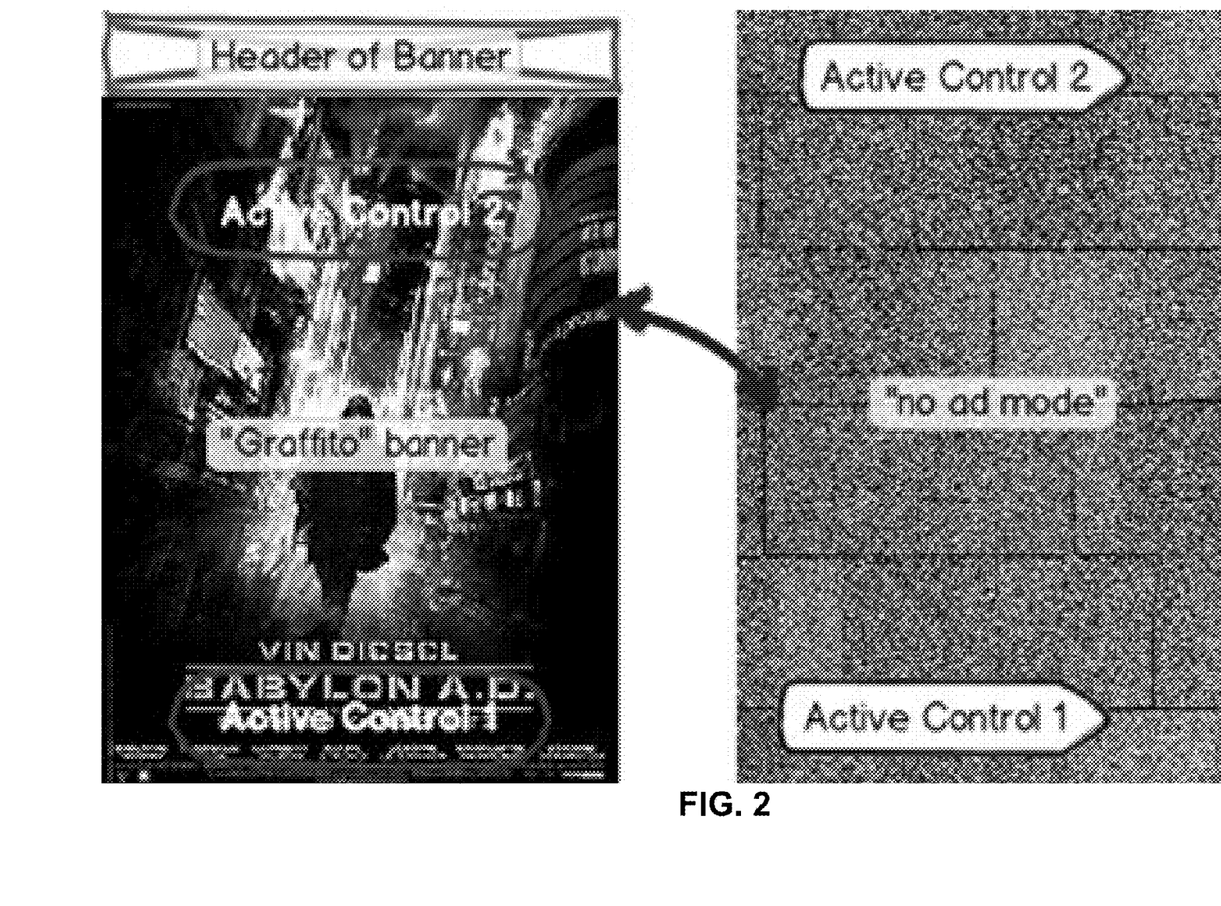
FIG. 2 illustrates a "graffito banner" with an active header, in accordance with the exemplary embodiment.

An example of the "graffito banners" is shown in FIG. 1. A "graffito banner" is shown on the left. According to the exemplary embodiment, some add banners can have active control elements. A user can click on the active control in order to show his reaction to the ad, or to receive more information. FIG. 2 illustrates a graffito banner with a header. Note that the header is not the ad itself, but is a tool (channel) for feedback collection. It does not need to deliver any information, except the "press here to react to ad" functionality. Note that the header is optional. The header is integrated into the banner and allows a user to click on it for expressing his reaction to the ad banner.

Figure 3:
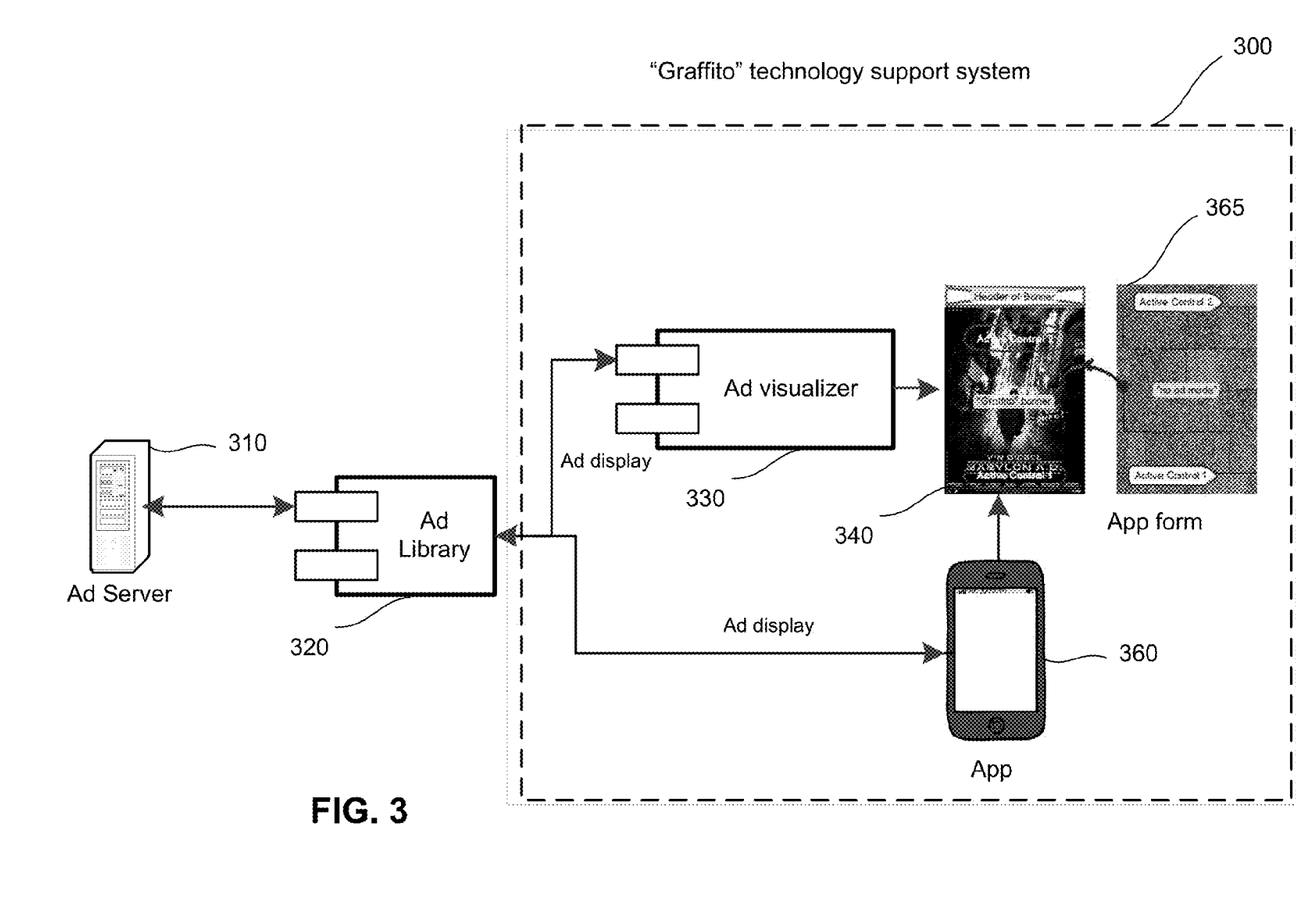
FIG. 3 illustrates system architecture, in accordance with the exemplary embodiment.

FIG. 3 illustrates system architecture, in accordance with the exemplary embodiment. An ad visualizer 330 communicates with a mobile device application 360. The ad visualizer 330 receives ads from an ad server 310 via an ad library 320 and renders the ads in the application form 340. According to the exemplary embodiment, the ad library 320 serves as an interface between the ad server 310 and a "graffito" technology support system 300.

The ad library 320 provides metadata acquired from the mobile device screen to the ad server 310 and selects appropriate ads based on the metadata. The metadata can include, for example, geopositioning/geolocation data from the user's computer or mobile device, gender data, specific application details (e.g., application type, application name, vendor), device type, OS, service provider, etc. Then, the selected ads are processed through the visualizer 330 and "graffitied" (i.e., displayed) within the selected GUI controls 365. Note that the ad library 320 also supports conventional ad banners displayed on the mobile device 360.

Figure 4:
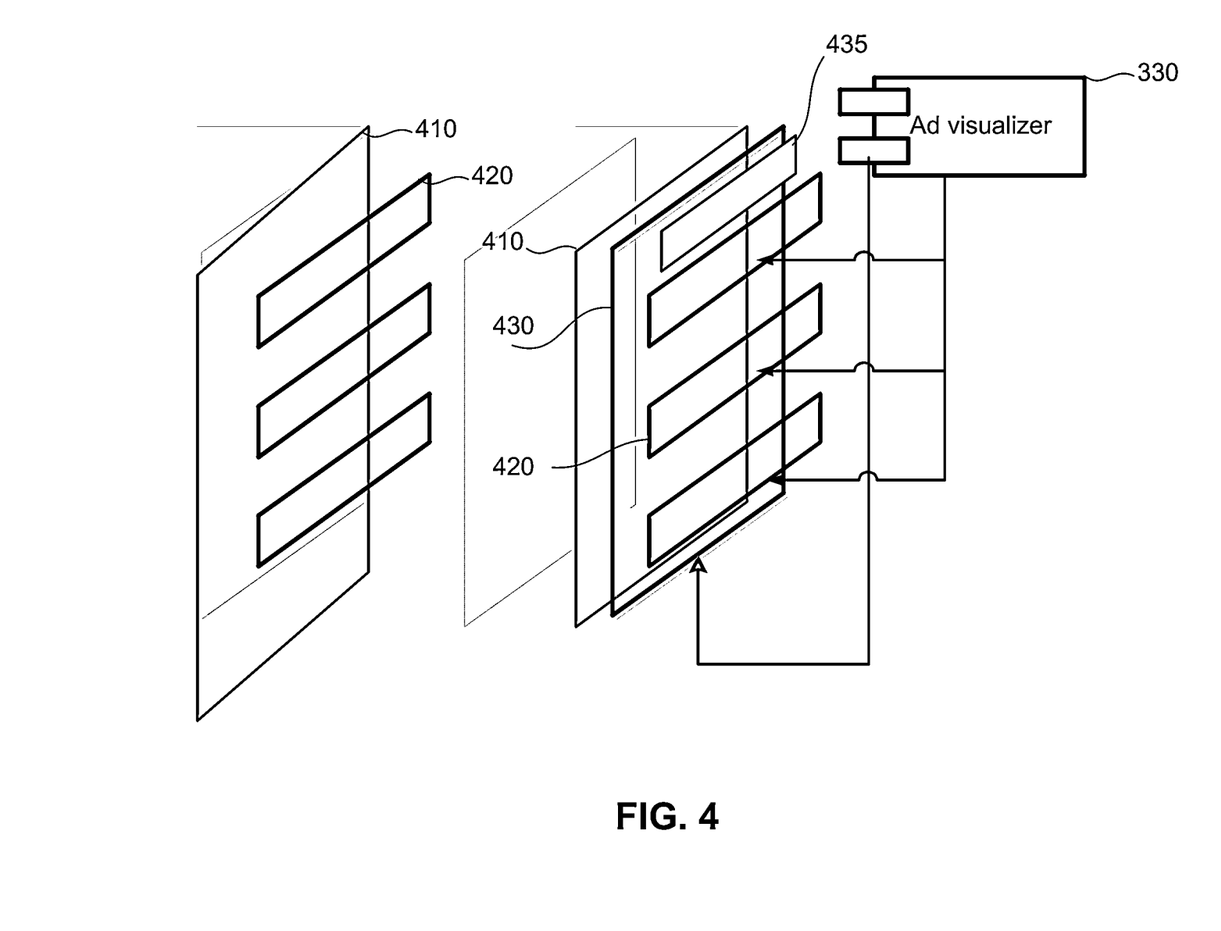
FIG. 4 illustrates a method implemented by the ad visualizer, in accordance to the exemplary embodiment.

FIG. 4 illustrates a method implemented by the ad visualizer, in accordance to the exemplary embodiment. The ad visualizer 330 controls transparency of the GUI elements (buttons) 420 and provides visibility of the ads that are loaded into an ad layer 430. A panel above the ad layer, which has "red color" will be transparent, the background of the button (but not the caption) will be transparent, the background of the checkbox, can also be transparent, etc. The ad layer 430 underlines all GUI elements 420. The ad visualizer 330 loads the ads into the ad layer 430. Then, the ad visualizer 330 makes a form background (fill) 410 transparent so the ads located on the ad layer 430 become visible.

Note that the ad layer 430 is normally transparent. The layer 430 changes its transparency when ad rendering is activated. At this point, the background of the selected GUI elements becomes transparent. The ad visualizer 330 supports static and dynamic ads. According to the exemplary embodiment, the ad banner header 435 is optional. The header 435 is not controlled by the ad visualizer 330. Instead, it is integrated into the ads. The ad banner header 435 allows users to react to the ad (or give feedback). According to the exemplary embodiment, an "inverse color" effect is applied to non-background areas (e.g., button labels) in order to make them visible in the background of the ad banners.

The ad visualizer 330 controls the transparency of the GUI elements based on their type (button, panel, checkbox, editbox, combobox etc.). Users can notify the system about their interest through a GUI elements, for example, an infrared camera, an infrared sensor or a video camera—where the sensor register (Kinect-type integrated or external device) replace physical "touch screen" and recognizes user's choice; a microphone—e.g., Siri-like model (a sensor with background voice-recognition module, which can be integrated or external)—a user indicates a GUI elements by voice command; a kinesthetic detector—a user uses a joystick, a mouse or wearable sensors (special gloves); a detector of eye movement—a user uses a device such as Googleglasses or a special camera that can recognize, by the position of the eyes, the GUI element the user is looking at and the command (e.g. double-blink) to "activate" our solution. The automatic transparency change option must be turned on by the GUI developers. The level of the brightness/transparency of ad-level as well as the transparency of the controls can be varied over time (they are managed by ad-visualizer, and can be set of various levels, such as 20%, 50%, 80%, etc., with permissions, or no permissions, to click through to the active elements, such as buttons or icons, on the layer below), which allows supporting additional visual effects for ad presentation.

Figure 5:
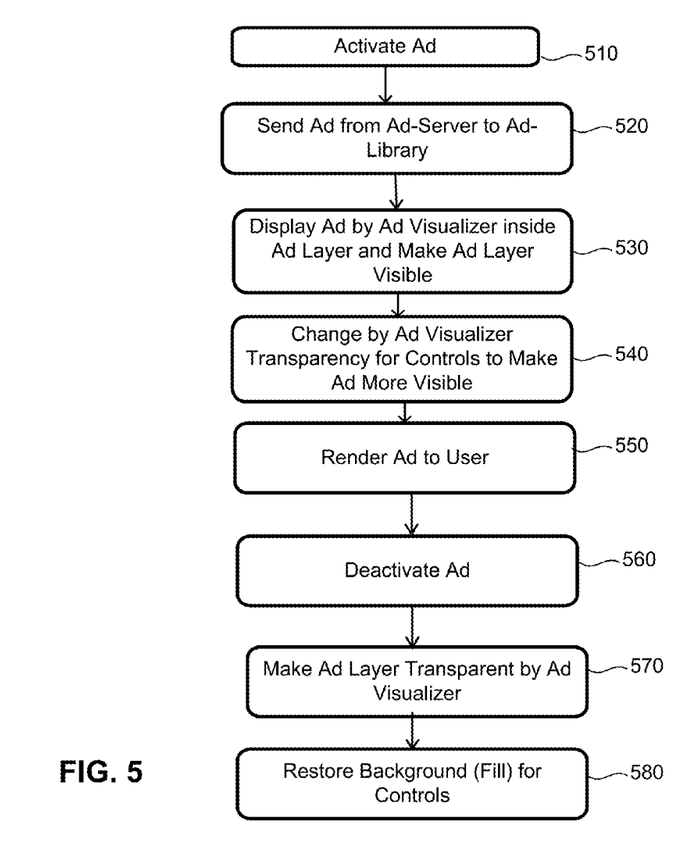
FIG. 5 illustrates a flow chart of a method for rendering ads, in accordance to the exemplary embodiment.

FIG. 5 illustrates a flow chart of a method for rendering ads, in accordance with the exemplary embodiment. An ad is activated in step 510 and sent from the ad server to the ad library in step 520. Then, the ad is displayed by the ad visualize inside the ad layer in step 530. The ad layer is made visible. In step 540, the ad visualizer changes transparency of the GUI controls in order to make the ads visible. Subsequently, the ads are rendered to a user in step 550. Once the ad is deactivated in step 560, the ad visualizer makes the ad layer transparent in step 570. The activation and deactivation of the ad is the responsibility of visualizer—it can do it based on time delay, external request from ad-platform, application request, and so on. Subsequently, the background of the GUI controls is restored.

Those skilled in the art will appreciate that the proposed method better attracts mobile device users' attention to the ads. The method allows the use of relatively large ad banners on small screens. The ad banners do not take up any screen space when not being displayed. According to the exemplary embodiment, the existing GUI elements (e.g., panels, checkboxes, buttons, etc.) are used. Each of the GUI elements has some areas filled with a background color. The background color is advantageously replaced by the ad banner content.

Thus, the user sees the ad banner through a regular GUI control, while the functionality of the control is not affected. For example, the "Open" button will continue performing an action "Open", check- and combo-buttons will perform the usual functions, etc.

Figure 6:
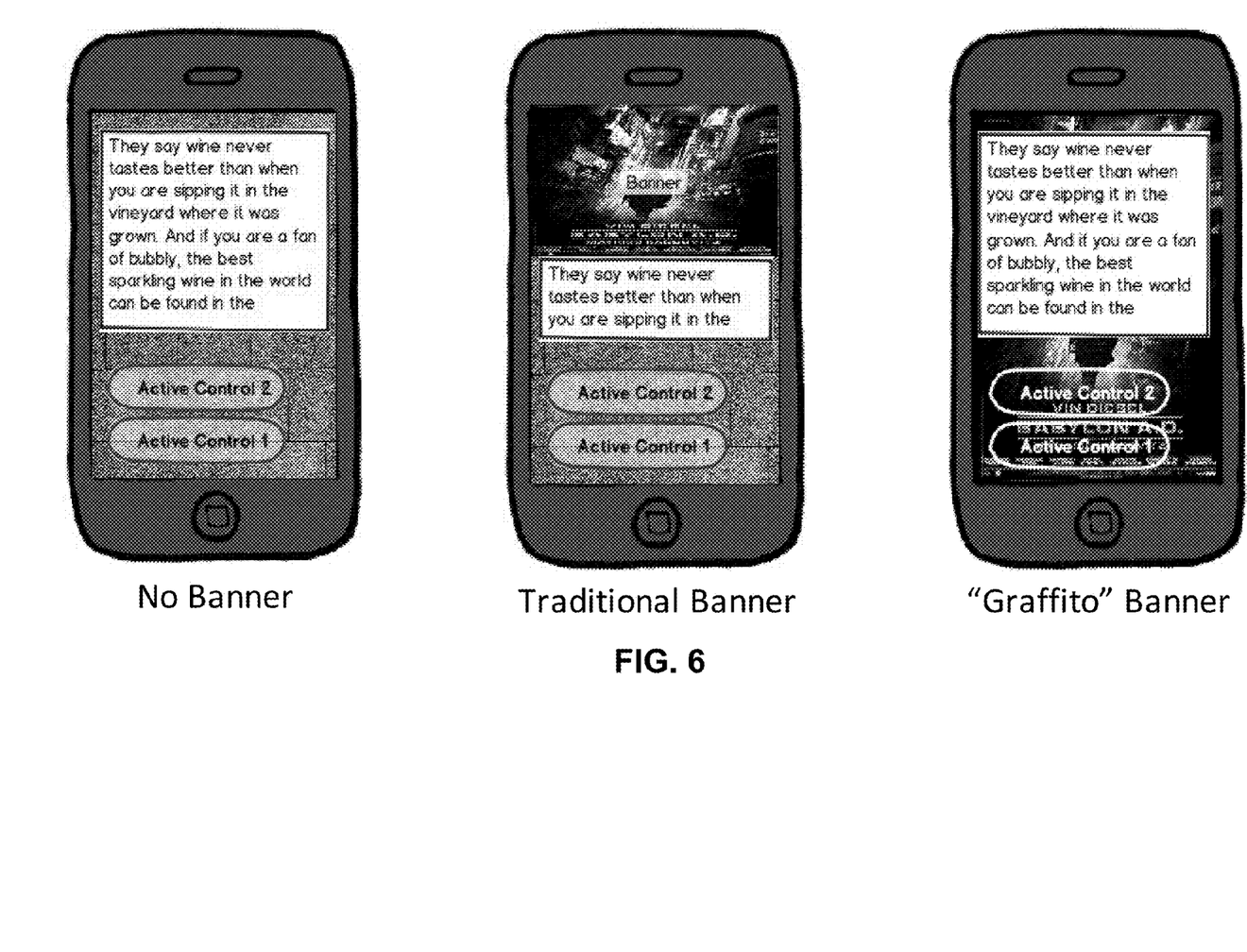
FIG. 6 illustrates examples of ads displayed on a mobile device.
Figure 7:
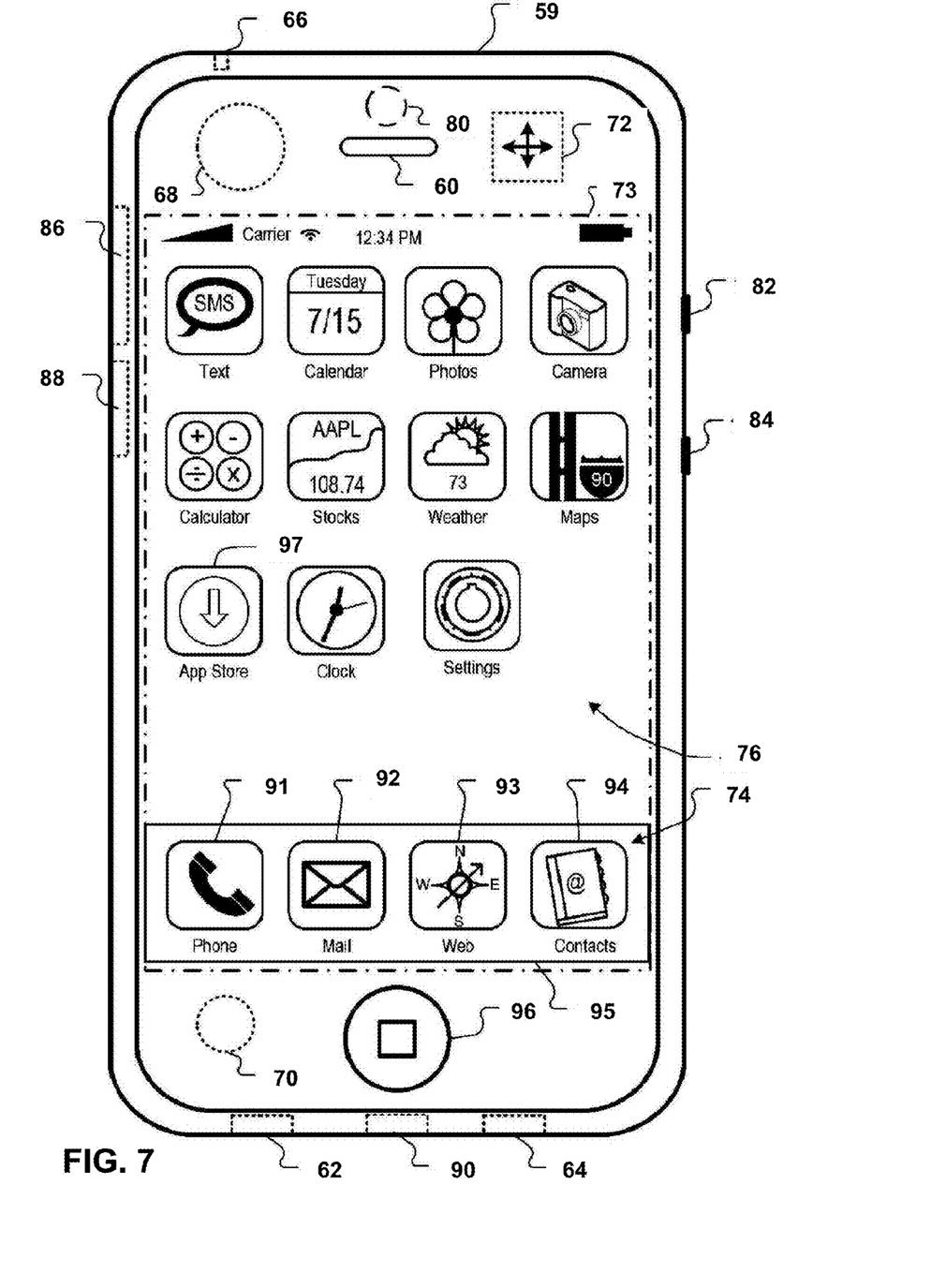
FIG. 7 is a block diagram of an exemplary mobile device that can be used in the invention.

FIG. 6 illustrates examples of ads displayed on a mobile device. The left example illustrates an ad displayed without a banner. The middle example illustrates a traditional banner that takes up a portion of the screen. The example on the right illustrates a "graffito" banner that is displayed inside an active GUI control. This banner does not take up screen space, because it becomes invisible after deactivation.

Figure 11:
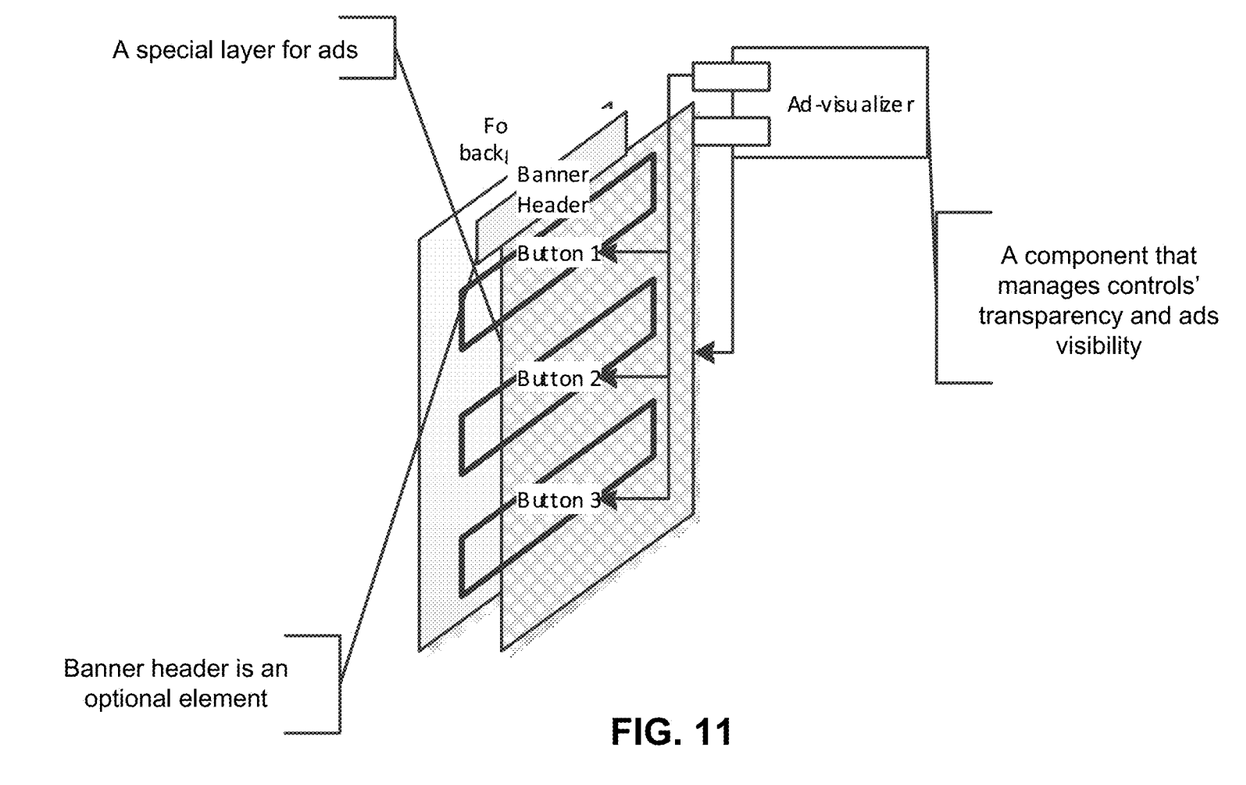
FIG. 11 represents an alternative method for ad-layer positioning.

FIG. 11 represents an alternative method for ad-layer positioning—above all the elements in the screen. In this case, the ad-visualizer sets up transparency for the ad-layer (rather than for form controls). The ad-layer translates all the events (touches, swipes, gestures, etc.) to the elements behind it—here, the ad-layer is acting as a passive element. "On top" position of ad-layer allows to draw the information in more flexibly—there are no potential restrictions due to the controls behind it—each piece of the form can be used for the ads. The ad-visualizer also can dynamically recognize "free areas" in the form and/or on the screen, and shift an ad to them in a real-time mode while the user performs his usual activities. The ad-visualizer analyses the surface behind the ad-layer and recognizes the areas with the background or monotone color and sufficient size, which are suitable for ads and commands the ad-layer to show the ads in those spaces. Different transparency levels, as well as brightness of ad-laver, allow delivery of different visual effects.

The Ad Visualizer (see FIG. 9) is the part of an Ad Activation Engine, which is distributed as a pre-compiled library available for application developers. Other components of the Ad Activation Engine are Event Catcher and Customer Feedback Processing.

Figure 9:
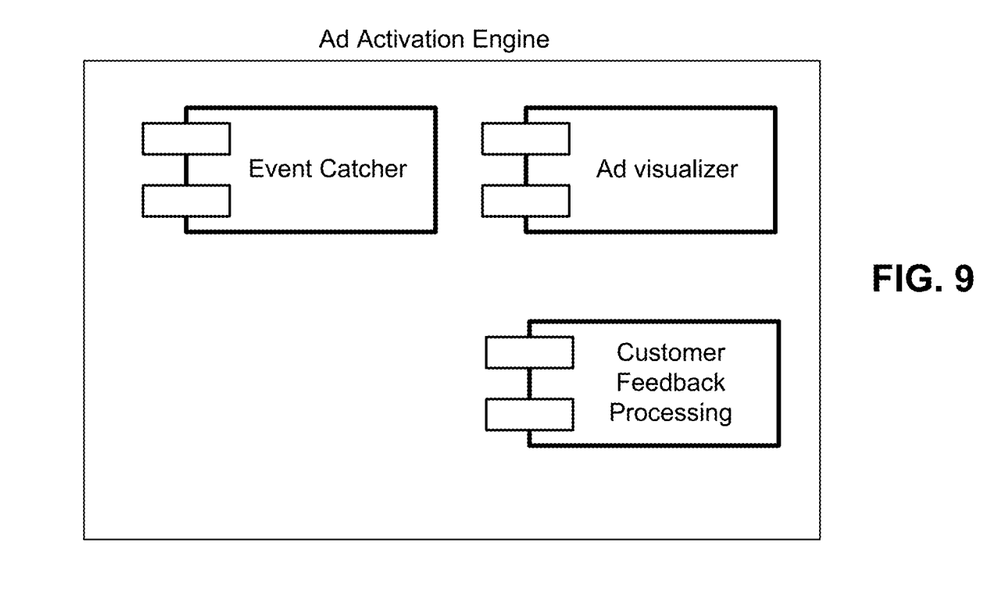
FIGS. 9-10 illustrate operation of the Ad Activation Engine.

The Event catcher is registered in the OS events processing stack as a receiver for several kinds of inbound events and recognizes the events that deliver ad-data. The Ad Visualizer is responsible for ad presentation in the applications. The Customer feedback processing component is responsible for "click to ad header" events processing, such as opening a link or sending the event to an Ad server or sending data (e.g., coordinates or calendar event) to the standard application, or activating a dialog window.

Figure 10:
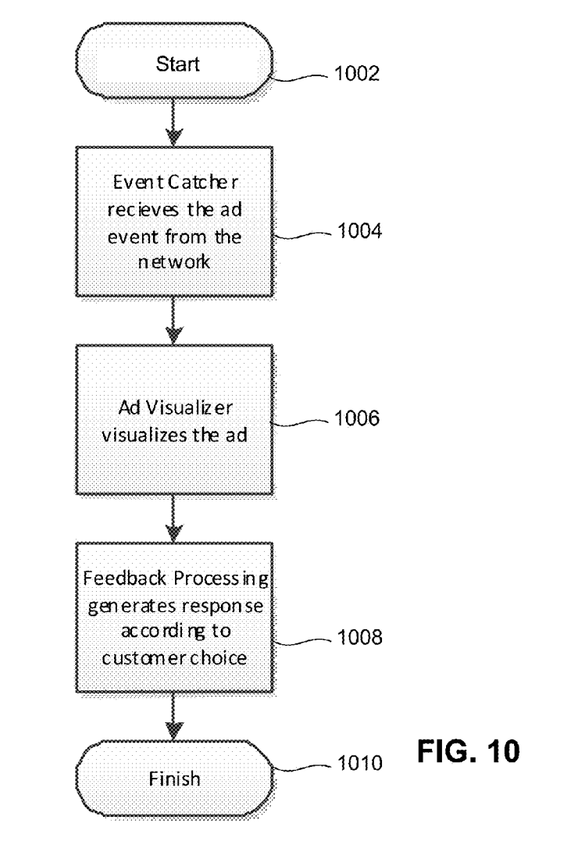

The operation of the Ad Activation Engine is shown in FIG. 10. After starting (step 1002), the Event Catcher receives the advertisement from a network source, such as an Ad server (step 1004). In step 1006, the Ad Visualizer renders the ad to the user. In step 1008, the Feedback processing component generates a response based on input from the user, and sends it to the Ad Server. In step 1010, the process ends, or returns to step 1002.

Figure 8:
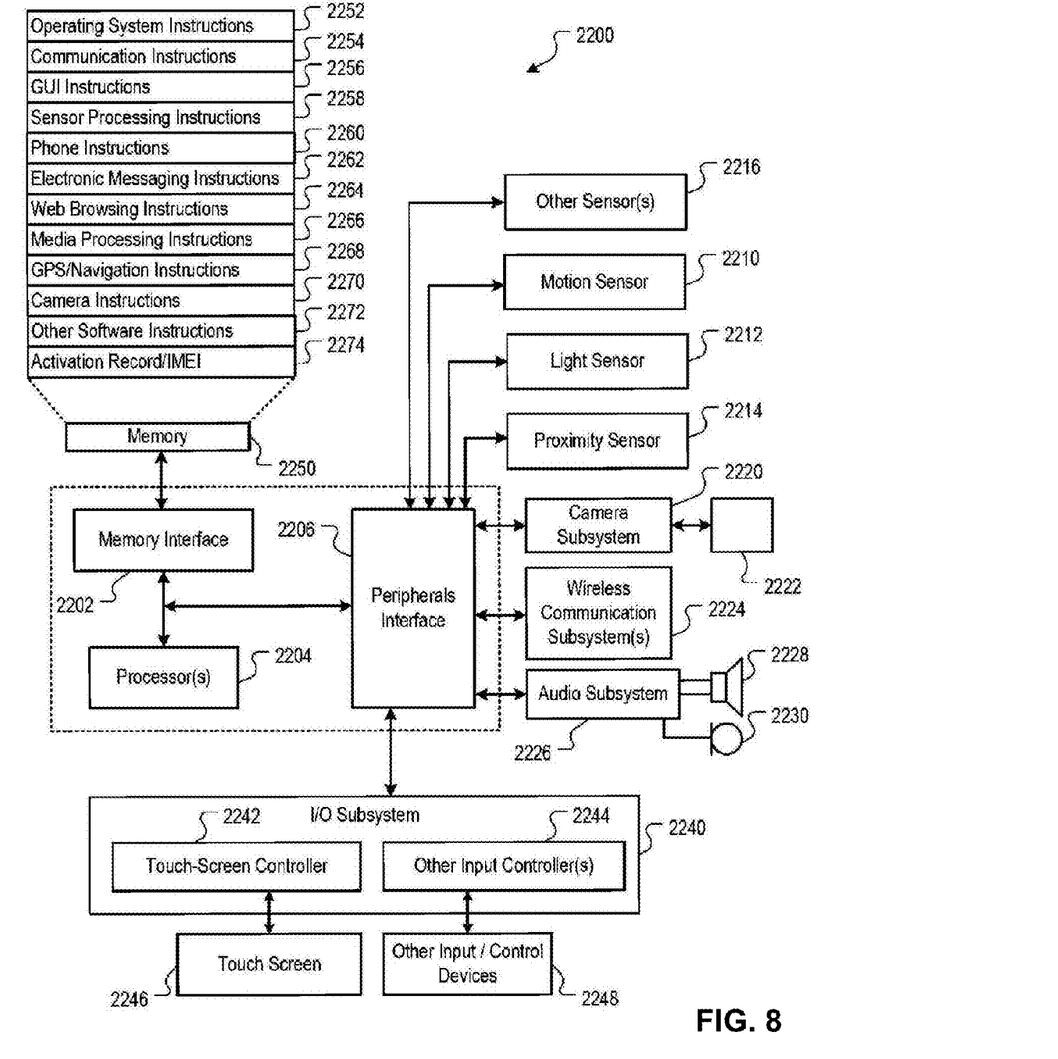
FIG. 8 is a block diagram of an exemplary implementation of the mobile device.

FIG. 8 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 9 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Those skilled in the art will appreciate that proposed system and method allow for effective advertising directed to mobile device users.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method for rendering advertisements on computing devices, the method comprising:
   selecting an advertisement to be rendered to a user of a computing device based on metadata received from a user's computing device;
   loading the selected advertisement from an ad server using an ad library located on the computing device, wherein the ad library is an interface between the ad server and the computing device and provides the metadata to the ad server;
   processing the advertisement by an ad visualizer and loading the advertisement into a transparent full-screen ad layer that is governed by existing native GUI controls, wherein the ad layer translates user-generated events to active elements behind it or through it;
   changing transparency of the ad layer to "visible" by the ad visualizer;
   changing transparency of the existing native GUI controls to make the advertisement on the ad layer visible, wherein visible surfaces of the existing native GUI controls are filled with a background color or pattern and the visible surfaces are "painted" by advertisement data from the ad layer;
   rendering the advertisement to the user through or behind the existing native GUI controls while functionality and interactivity of the control is not affected;
   wherein the existing native GUI controls are used independent of each other such that only some of the existing native GUI controls are used to display advertisements;
   deactivating the advertisement;
   making the ad layer transparent by the ad visualizer; and
   restoring a background transparency of the existing native GUI controls and of the visible surfaces, and restoring original processing of the user generated events.

2. The method of claim 1, wherein the computing device is a mobile device and the metadata includes any of user gender, application type loaded on the mobile device, application name loaded on the mobile device, mobile device vendor, mobile device type, mobile device OS and mobile device service provider.

3. The method of claim 2, wherein the advertisement has a clickable header that is integrated into the advertisement for collection of user feedback.

4. The method of claim 1, wherein GUI controls are any of:
   a button,
   a checkbox; and
   a panel,
   a combobox,
   an editbox.

5. A method for rendering advertisements on computing devices, the method comprising:
   selecting an advertisement to be rendered to a user based on metadata received from a user's computing device;
   loading the selected advertisement from an ad server using an ad library located on the computing device, wherein the ad library is an interface between the ad server and the computing device and provides the metadata to the ad server;
   processing the advertisement by an ad visualizer and loading the advertisement into a top transparent full-screen ad layer that is governed by existing native GUI controls, wherein the ad layer translates user-generated events to active elements behind it or through it;
   translating gestures of the user, including touches and swipes, through the ad layer to the existing native GUI controls behind it or through it, wherein the ad layer translates user-generated events to active elements behind it or through it;

changing transparency of the ad layer to "visible" by the ad visualizer;

rendering the advertisement to the user above the existing native GUI controls, wherein visible surfaces of the existing native GUI controls are filled with a background color or pattern and the visible surfaces are "painted" by advertisement data, while functionality and interactivity of the control is not affected;

wherein the existing native GUI controls are used independent of each other such that only some of the existing native GUI controls are used to display advertisements;

deactivating the advertisement; and restoring background transparency of the ad layer control, and restoring original processing of the user generated events.

6. The method of claim 5, wherein the advertisement has a clickable header.

7. A system for rendering advertisements on computing devices, the system comprising:

a hardware ad server for storing ads;

an ad library for selecting the ads based on user-related metadata received from the computing devices, wherein the ad library is an interface between the ad server and the computing devices and provides the metadata to the ad server;

an ad visualizer connected to the ad library;

at least one computing device running a mobile application connected to the ad visualizer and utilizing existing native GUI controls for controlling display of the computing device, wherein the ad library selects ads from the ad server and provide the ads to the ad visualizer; and wherein the ad visualizer processes the ads and renders them to a user through visible surfaces of the existing native GUI controls of the mobile application running on the computing device, wherein visible surfaces of the existing native GUI controls are filled with a background color or pattern and the visible surfaces are "painted" by advertisement data while functionality and interactivity of the existing native GUI controls is not affected;

wherein the existing native GUI controls are used independent of each other such that only some of the existing native GUI controls are used to display advertisements, and wherein original processing of the user generated events is restored when the ads are no longer rendered.

8. The system of claim 7, wherein the ad visualizer changes transparency of the existing native GUI controls in order to display advertisement content.

9. The system of claim 7, wherein the ad visualizer loads advertisement content into a transparent ad layer underlining the existing native GUI controls.

10. The system of claim 6, wherein the ad visualizer makes the ad layer visible in order to render the ads to the user.

11. A method for rendering advertisements on computing devices, the method comprising:

selecting an advertisement for rendering to a user based on metadata received from a user's computing device;

loading the selected advertisement from an ad server into an ad library, wherein the ad library is an interface between the ad server and the computing device and provides the metadata to the ad server;

processing the advertisement by an ad visualizer and loading the advertisement into a transparent full-screen ad layer that is governed by existing native GUI controls, wherein the ad layer translates user-generated events to active elements behind it or through it;

using the ad visualizer to change a transparency of the ad layer to make it visible by utilizing the existing native GUI controls;

rendering the advertisement to the user through or behind visible surfaces of the existing native GUI controls, wherein the visible surfaces of the existing native GUI controls are filled with a background color or pattern and the visible surfaces are "painted" by advertisement data while functionality and interactivity of the control is not affected;

wherein the existing native GUI controls are used independent of each other such that only some of the existing native GUI controls are used to display advertisements;

deactivating the advertisement;

making the ad layer transparent by the ad visualizer; and restoring background transparency of the existing native GUI controls, and restoring original processing of the user generated events.

12. The method of claim 11, wherein the ad-layer shows multiple advertisements on different portions of the screen at one time.

13. The method of claim 11, wherein the ad visualizer dynamically changes size, color, position and transparency of an advertisement.

14. The method of claim 1, wherein, wherein the advertisement is displayed in front of any webpage content.

\* \* \* \* \*